United States Patent
Dettorre et al.

(10) Patent No.: US 12,103,257 B2
(45) Date of Patent: Oct. 1, 2024

(54) METHOD FOR DETACHING ELASTOMER PARTICLES

(71) Applicant: COMPAGNIE GENERALE DES ETABLISSEMENTS MICHELIN, Clermont-Ferrand (FR)

(72) Inventors: Jean-Marie Dettorre, Clermont-Ferrand (FR); Frederic Drago, Clermont-Ferrand (FR); Michel Druet, Clermont-Ferrand (FR); Cyril Piq, Clermont-Ferrand (FR); Lionel Silva, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 171 days.

(21) Appl. No.: 17/784,263

(22) PCT Filed: Dec. 3, 2020

(86) PCT No.: PCT/FR2020/052261
§ 371 (c)(1),
(2) Date: Jun. 10, 2022

(87) PCT Pub. No.: WO2021/116568
PCT Pub. Date: Jun. 17, 2021

(65) Prior Publication Data
US 2023/0045138 A1    Feb. 9, 2023

(30) Foreign Application Priority Data
Dec. 11, 2019  (FR) ...................................... 1914129

(51) Int. Cl.
*B29D 30/06*       (2006.01)
*B08B 9/00*        (2006.01)

(52) U.S. Cl.
CPC ............ *B29D 30/0662* (2013.01); *B08B 9/00* (2013.01); *B08B 2209/005* (2013.01); *B29D 2030/0663* (2013.01)

(58) Field of Classification Search
None
See application file for complete search history.

(56) References Cited

U.S. PATENT DOCUMENTS

| 2010/0258529 A1* | 10/2010 | Mori ................. H01J 37/32155 118/712 |
| 2013/0146084 A1* | 6/2013 | Wetterich ................. B08B 7/02 15/94 |
| 2020/0391415 A1 | 12/2020 | Bargagli Petrucci et al. |

FOREIGN PATENT DOCUMENTS

| IT | 2018/00000176 A1 | 7/2019 |
| KR | 10-2018-0068645 A | 6/2018 |

(Continued)

OTHER PUBLICATIONS

English Machine translation of WO96/11755.*
International Search Report dated Mar. 9, 2021, in corresponding PCT/FR2020/052261 (4 pages).

*Primary Examiner* — Eric W Golightly
(74) *Attorney, Agent, or Firm* — VENABLE LLP

(57) ABSTRACT

A method for detaching elastomer particles that adhere on microvalves (3) disposed on the internal surface of a vehicle tire mold (2) comprises vibrating the microvalve (3) at a constant amplitude ranging between approximately 0.05 and 0.2 mm and at a frequency ranging between 20,000 and 30,000 Hz during the detachment of the particles from the microvalve (3).

3 Claims, 3 Drawing Sheets

(56) References Cited

FOREIGN PATENT DOCUMENTS

| WO | 96/11755 A1 | 4/1996 |
| WO | 2016/105306 A1 | 6/2016 |
| WO | 2019/130055 A1 | 7/2019 |

* cited by examiner

[Fig 1]
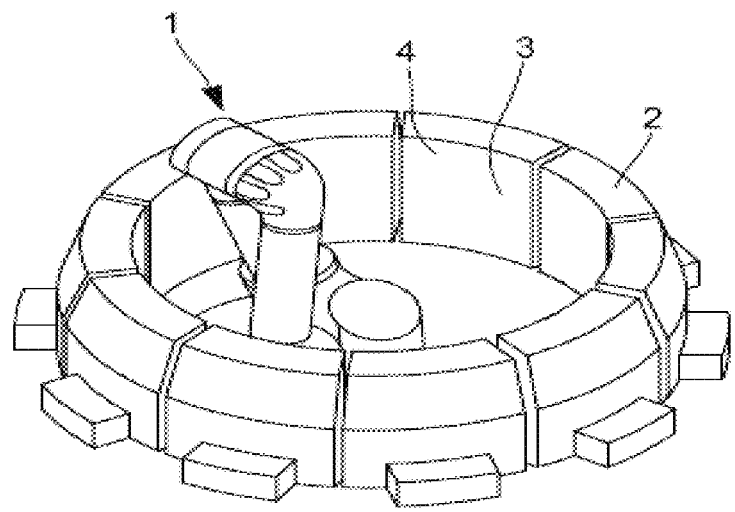
[Fig 2]
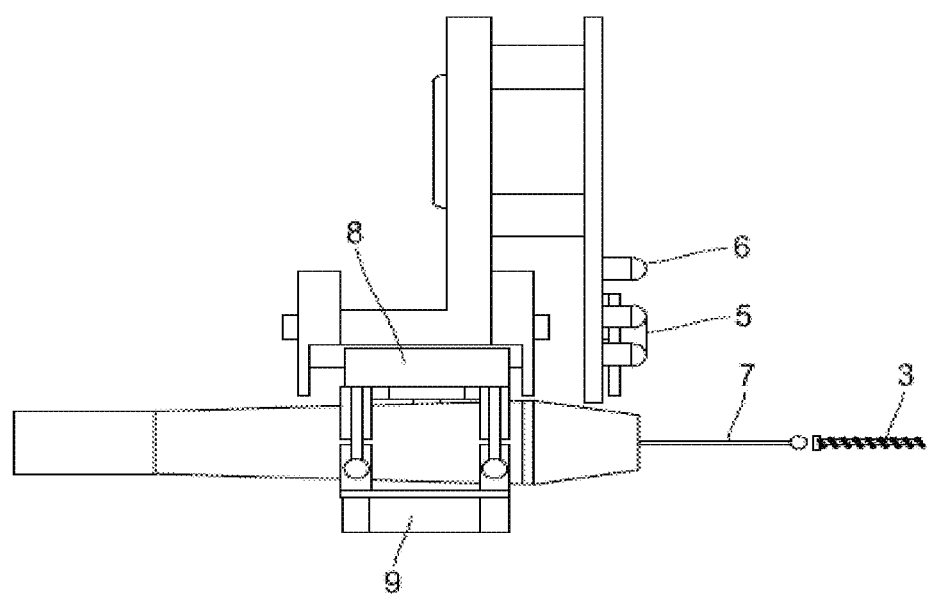

[Fig 3]
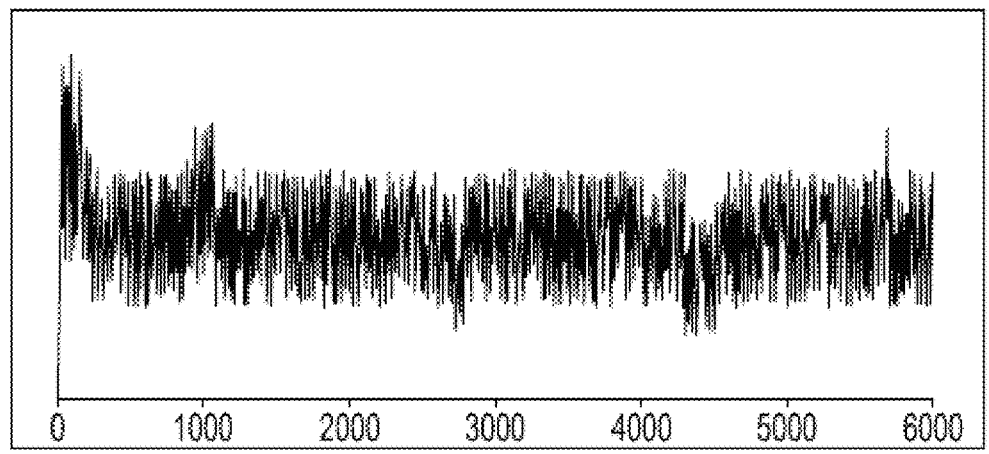
[Fig 4]
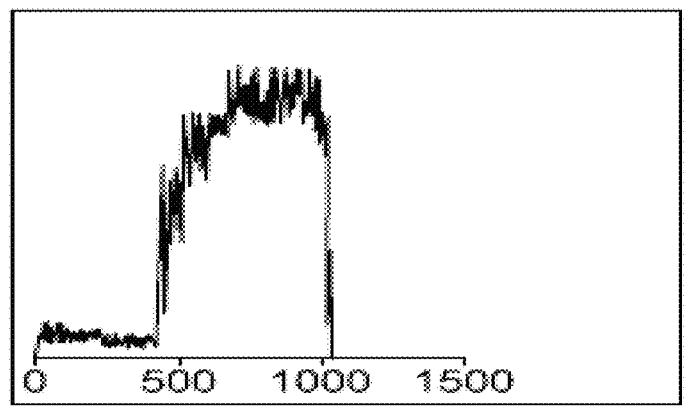
[Fig 5A]
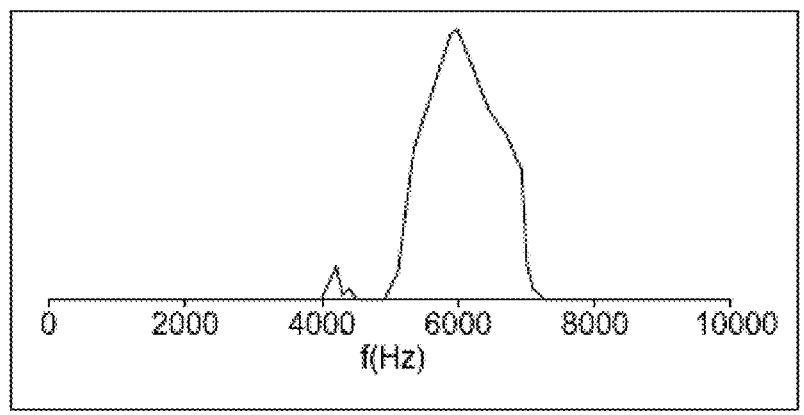

[Fig 5B]
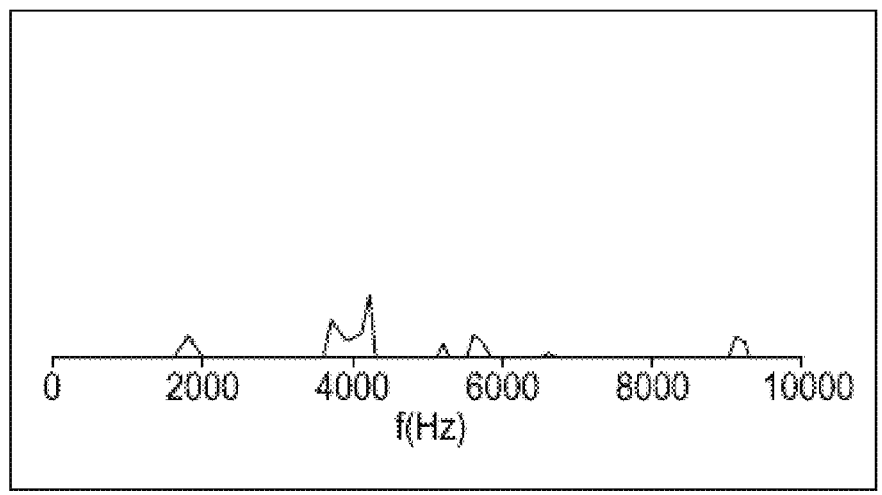

METHOD FOR DETACHING ELASTOMER PARTICLES

BACKGROUND

The invention relates to a method for detaching elastomer particles that adhere to the surface of the microvalves disposed on the inner surface of tyre curing moulds.

From the application WO 2016/105306, a method is known for cleaning the microvalves of a tyre curing mould which consists in subjecting all of the mould to ultrasounds before cleaning them when dry then immersing them in a cleaning liquid before rinsing and drying. This also entails the dismantling and unavailability of the mould for a time which can be lengthy and incompatible with industrial requirements.

Unfortunately, such a method is complex through the large number of steps and takes a long time to perform. Also, it does not allow a targeted, and therefore potentially meticulous, cleaning of the valves.

So there remains the need to have a method which allows the targeted detection of the internal zones of tyre curing moulds, in a limited number of steps, so as to perform a targeted cleaning.

SUMMARY

The subject of the invention is therefore a method for detaching elastomer particles which adhere to microvalves disposed on the inner surface of a vehicle tyre curing mould. This method is characterized in that the presence of a microvalve disposed on said inner surface of the mould is detected, and said microvalve is made to vibrate with a constant amplitude of between approximately 0.05 to 0.2 mm and a frequency of between 20 000 and 30 000 Hz during the detachment of the particles from said microvalve.

The method according to the invention offers the advantage of being simple to implement, notably through a small number of steps, and of allowing a meticulous cleaning of the constituent elements of the microvalves.

Preferably, after the final detachment of the particles, an abrupt change of frequency is detected to stop the vibrations.

Preferably, the abrupt change of amplitude is an increase of the frequencies up to approximately 6000 Hz.

BRIEF DESCRIPTION OF THE FIGURES

The invention will be described using the following figures, which are schematic and not necessarily to scale, and in which:

FIG. 1 represents a schematic overview of the device for cleaning the inside of a tyre curing mould, FIG. 2 represents a schematic view of the device according to the invention, FIG. 3 represents the vibratory signal emitted during the cleaning of a microvalve, FIG. 4 represents the abrupt variation of the vibratory signal at the end of the cleaning of the microvalve, and FIGS. 5A and 5B represent a conversion, in a defined frequency range, by a Fourier transform of the different stages of cleaning of a microvalve.

DETAILED DESCRIPTION

As FIG. 1 shows, the cleaning device, of general reference 1, is disposed inside a tyre curing mould 2. The mould 2 comprises a multitude of microvalves 3 disposed over its entire inner surface 4.

As FIG. 2 shows in more detail, the device comprises a camera 5 intended to detect each microvalve 3. The camera 5 is linked to a "Hough Circle Transform" type algorithm via a computer (not represented). This algorithm makes it possible to take a complete reading of the inner surface 4 of the mould 2. The camera 5 is lit by a lamp 6 of LED type. The device further comprises an ultrasonic pen 7, mounted on a rail 8, intended to gradually bring the pen into contact with a microvalve, and an accelerometer 9 intended to detect the change of frequency indicating the end of the cleaning of the microvalve. Instead of the accelerometer, it is possible to use a microphone which will be used to record the changes of frequency of the vibrations, by noises.

The device according to the invention operates as follows. The camera 5 detects a microvalve 3 using management by the algorithm which performs a complete reading of the inner surface 4 of the mould 2. After having identified a microvalve 3, the ultrasonic pen 7, mounted on a rail, is brought closer by increments until it touches the surface of the microvalve 3. As soon as it touches, the pen begins to vibrate. The vibrations are intended to remove the elastomer particles which adhere to the microvalves 3. The amplitude of the vibrations is approximately 0.1 mm with a frequency of approximately 25 000 Hz. The accelerometer measures the amplitude and the frequency of the vibrations.

FIG. 3 shows the frequency spectrum obtained when the tip of the pen 7 is in contact with the microvalve. As can be seen, the amplitude of the vibrations is low and almost constant. The result of FIG. 3 is obtained using the accelerometer 9.

Once the microvalve is cleaned, the elastomer particle is detached from it; the spectrum of the frequencies obtained is then that represented in FIG. 4. An abrupt increase in the frequency of the vibrations to approximately 6000 Hz can be seen.

FIG. 5A shows the Fourier transform representation of the vibrations when the microvalve is soiled by elastomer particles. The peak at 6000 Hz clearly shows this state of soiling.

FIG. 5B shows the Fourier transform representation of the vibrations when the elastomer particles no longer adhere to the surface of the microvalve. The initial peak at 6000 Hz has disappeared. Small frequency peaks are regularly distributed over the spectrum.

The invention claimed is:

1. A method for detaching elastomer particles which adhere to microvalves disposed on an inner surface of a vehicle tire curing mold, the method comprising:
   detecting a presence of a microvalve disposed on the inner surface of the vehicle tire curing mold;
   contacting a surface of the microvalve with an ultrasonic pen; and
   vibrating the microvalve with a constant amplitude of between approximately 0.05 and 0.2 mm and a frequency of between 20,000 and 30,000 Hz during detachment of the elastomer particles from the microvalve.

2. The method according to claim 1, further comprising, after final detachment of the elastomer particles, detecting an abrupt change of frequency of the vibrations to stop the vibrations.

3. The method according to claim 2, wherein the abrupt change of frequency is an increase up to approximately 6000 Hz.

* * * * *